United States Patent
Meilland

(10) Patent No.: US 10,984,583 B2
(45) Date of Patent: Apr. 20, 2021

(54) RECONSTRUCTING VIEWS OF REAL WORLD 3D SCENES

(71) Applicant: Apple Inc., Cupertino, CA (US)

(72) Inventor: Maxime Meilland, Nice (FR)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/288,211

(22) Filed: Feb. 28, 2019

(65) Prior Publication Data

US 2019/0304170 A1    Oct. 3, 2019

Related U.S. Application Data

(60) Provisional application No. 62/649,202, filed on Mar. 28, 2018.

(51) Int. Cl.
*G06T 15/20* (2011.01)
*G06T 7/73* (2017.01)

(52) U.S. Cl.
CPC .............. *G06T 15/205* (2013.01); *G06T 7/74* (2017.01); *G06T 2200/08* (2013.01); *G06T 2207/10024* (2013.01); *G06T 2207/10028* (2013.01); *G06T 2207/30244* (2013.01)

(58) Field of Classification Search
None
See application file for complete search history.

(56) References Cited

U.S. PATENT DOCUMENTS

| 6,377,257 | B1 * | 4/2002 | Borrel | G06T 15/005 |
| | | | | 345/419 |
| 8,570,320 | B2 * | 10/2013 | Izadi | G06T 17/00 |
| | | | | 345/420 |
| 10,109,104 | B2 * | 10/2018 | Newman | G01S 17/87 |
| 2010/0039447 | A1 * | 2/2010 | Nakao | H04N 1/387 |
| | | | | 345/634 |
| 2011/0096832 | A1 * | 4/2011 | Zhang | H04N 13/257 |
| | | | | 375/240.08 |
| 2014/0225985 | A1 * | 8/2014 | Klusza | G06T 7/70 |
| | | | | 348/43 |
| 2016/0270750 | A1 * | 9/2016 | Machida | A61B 6/54 |
| 2016/0381341 | A1 * | 12/2016 | El Choubassi | H04N 13/271 |
| | | | | 348/43 |
| 2017/0018088 | A1 | 1/2017 | Jeong et al. | |

(Continued)

FOREIGN PATENT DOCUMENTS

CN         105100773         7/2017

OTHER PUBLICATIONS

Meilland, Maxime and Comport, Andrew I., "On Unifying Key-Frame and Voxel-Based Dense Visual SLAM at Large Scales", 2013 IEEE/RSJ International Conference on Intelligent Robots and Systems; pp. 1-7.

(Continued)

*Primary Examiner* — Jason A Pringle-Parker
(74) *Attorney, Agent, or Firm* — Thompson Hine LLP

(57) ABSTRACT

Various implementations are disclosed of producing a 3-dimensional model of a scene. Various method, electronic device, or system implementations use RGB-D camera to provide RGB-D video content or periodic aligned RGB images and depth images to localize camera spatial position(s) defined in a three dimensional (3D) coordinate system or reconstruct a 3D virtual representation of a current camera frame in the 3D coordinate system, each in real time.

20 Claims, 10 Drawing Sheets

(56) References Cited

U.S. PATENT DOCUMENTS

2017/0357858 A1* 12/2017 Mendonca ............... G06T 7/30
2018/0005015 A1   1/2018 Hou et al.
2018/0176483 A1*  6/2018 Knorr ............... H04N 5/23222

OTHER PUBLICATIONS

Meilland, Maxime and Comport, Andrew I., "Super-Resolution 3D Tracking and Mapping", I3S CNRS Laboratory, University of Nice Sophia Antipolis; 2013 IEEE/RSJ International Conference on Robotics and Automation; pp. 1-7.

Meilland, Maxime, Barat, Christian and Comport, Andrew, "3D High Dynamic Range Dense Visual SLAM and Its Application to Real-Time Object Re-Lighting"; 2013 IEEE International Symposium on Mixed and Augmented Reality (ISMAR); pp. 1-10.

Maier, Robert, Schaller, Raphael, Cremers, Daniel, "Efficient Online Surface Correction for Real-time Large-Scale 3D Reconstruction"; Sep. 12, 2017; pp. 1-12.

Dai, Angela, Neissner, Matthias, Zollhofer, Michael, Izadi, Shahram and Theobalt, Christian, "BundleFusion: Real-Time Globally Consistent 3D Reconstruction using On-the-Fly Surface Re-Integration", Feb. 7, 2017, pp. 1-19.

Whelan, Thomas, Leutenegger, Stefan, Salas-Moreno, Renato F., Glocker, Ben and Davision, Andrew J., "ElasticFusion: Dense SLAM Without a Pose Graph"; Robotics: Science and Systems 2015, Rome, Italy, Jul. 13-17, 2015; pp. 1-9.

Gomez-Gutierrez, Daniel, Cuveas-Mayol, Walterio and Guerrero, J.J., "Inverse Depth for Accurate Photometric and Geometric Error Minimisationin RGB-D dense Visual Odometry"; 2015 IEEE International Conference on Robotics and Automation (ICRA); pp. 1-7.

* cited by examiner

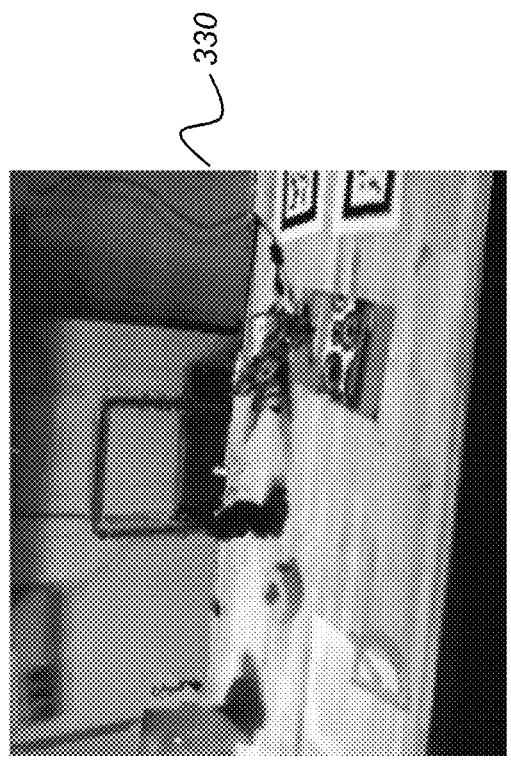
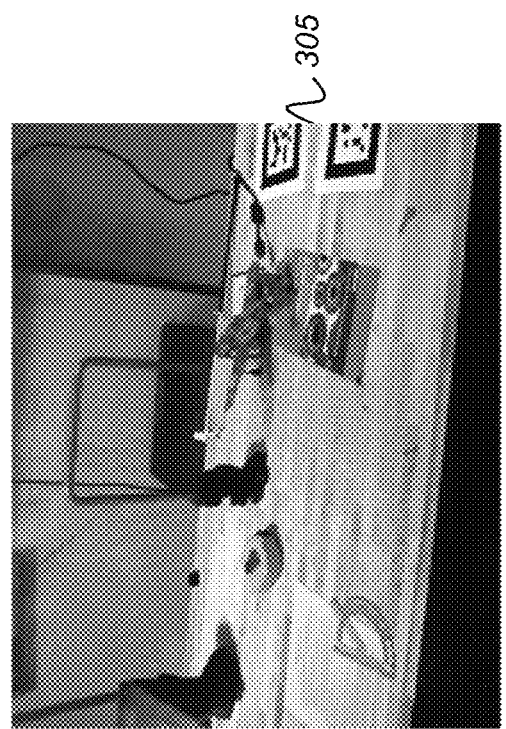
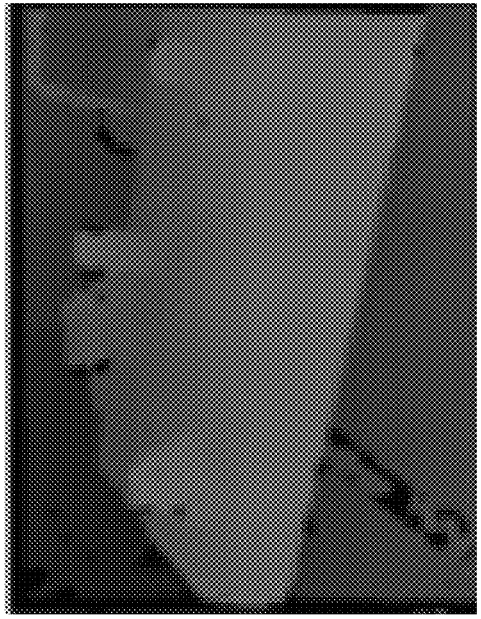
FIG. 3B
FIG. 3A

RECONSTRUCTING VIEWS OF REAL WORLD 3D SCENES

CROSS-REFERENCE TO RELATED APPLICATION

This application claims the benefit of U.S. Provisional Application Ser. No. 62/649,202 filed Mar. 28, 2018, which is incorporated herein in its entirety.

TECHNICAL FIELD

The application generally relates to video coding, and also to systems, methods, and devices to produce a 3-dimensional model of a scene from a RGB-D sensor.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC), and extensions of such standards. The video devices may transmit, receive, encode, decode, or store digital video information more efficiently by implementing such video coding techniques.

Digital video capabilities include virtual representation of a current view of the real world scene of an RGB-D sensor.

SUMMARY

Various implementations disclosed herein include devices, systems, and methods that implement simultaneous localization and mapping for RGB-D sensors, such as RGB-D cameras. Various implementations disclosed herein include devices, systems, and methods that estimate a trajectory of a RGB-D sensor or render a 3D reconstruction of the scene (e.g., ongoing video content) captured by the RGB-D sensor. In some implementations, such virtual reconstructions can be accessed by, interact with or be used in combination with virtual reality (VR) applications, mixed reality (MR) applications, or an augmented reality (AR) applications.

One example implementation involves performing operations at a device with one or more processors and a computer-readable storage medium. The device receives multiple frames of a real world scene within a field of view of a camera at multiple times, the frames including color values and depth values for pixels for the field of view of the camera. The device selects keyframes from the multiple frames of the real world scene within the field of view of the camera. The keyframes are associated with camera poses defined in a three dimensional (3D) coordinate system. The device receives a current frame of the real world scene currently within the field of view of the camera. The current frame includes current color values and current depth values for the pixels for the field of view of the camera at a current time. The device determines a current camera pose of the camera in the 3D coordinate system based on the current frame. The device provides a virtual representation of the current frame based on the current camera pose of the camera and two or more of the keyframes. The virtual representation is provided based on the color values and the depth values of the two or more of the keyframes.

One example implementation involves performing operations at a device with one or more processors and a computer-readable storage medium. The device receives multiple frames of a real world scene within a field of view of a camera at multiple times, the frames including color values and depth values for pixels for the field of view of the camera. The device selects keyframes from the multiple frames of the real world scene within the field of view of the camera. The keyframes are associated with camera poses defined in a three dimensional (3D) coordinate system. The device receives a current frame of the real world scene currently within the field of view of the camera. The current frame includes current color values and current depth values for the pixels for the field of view of the camera at a current time. The device determines a current camera pose of the camera in the 3D coordinate system based on the current frame. The device adjusts a keyframe of the keyframes based on the current frame and current pose. The keyframe is adjusted by combining the depth values using corresponding probability variance values of the depth values and combining the color values using corresponding probability variance values of the color values of the keyframe and the current frame. The device provides a virtual representation of the current frame based on the current camera pose of the camera and at least one of the adjusted keyframes.

Various implementations provide a virtual representation of the current frame or view of the real world scene. Various method, electronic device, or system implementations use RGB-D camera to provide RGB-D video or periodic aligned RGB images and depth images to (1) localize camera spatial position(s) defined in a three dimensional (3D) coordinate system and/or (2) reconstruct a 3D virtual representation of a current camera frame or view, each in real time.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 3A is a diagram showing current RGB-D sensor input, e.g., standard RGB color image from camera video content and an aligned standard camera depth map.

FIG. 3B is a diagram showing rendering a current 3D virtual reconstruction into the same pose corresponding to the images depicted in FIG. 3A, in accordance with some implementations.

Figure 1:
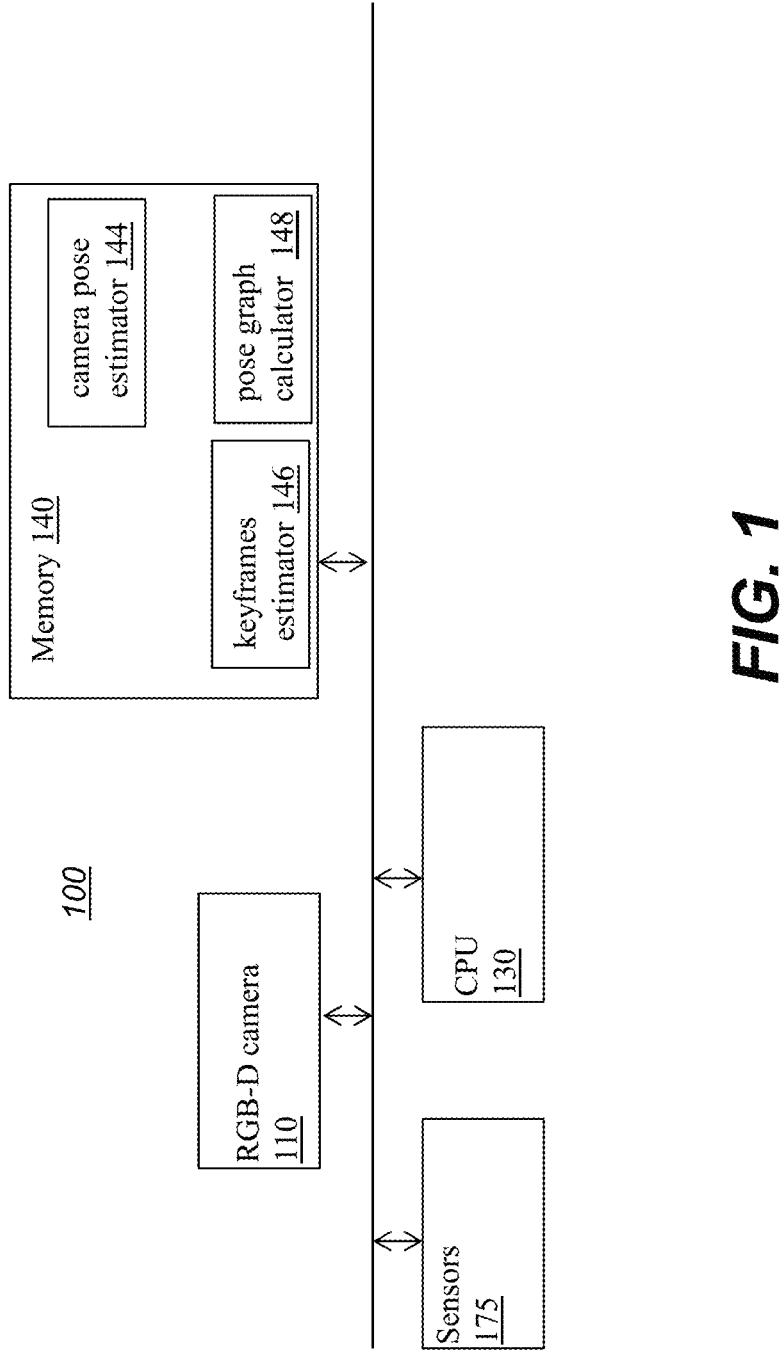
FIG. 1 is a block diagram of a simplified electronic device in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

Referring to FIG. 1, a simplified block diagram of an electronic device 100 is depicted, in accordance with some implementations. In some implementations, the electronic device 100 is part of a multifunctional device, such as a mobile phone, tablet computer, personal digital assistance, portable music/video player, wearable device, or other electronic device that includes an image processing device, though not shown in FIG. 1. In some implementations, the electronic device 100 is connected, via a network, to other network devices, such as other mobile devices, tablet device desktop devices, as well as network storage devices, including servers and the like.

In some implementations, the electronic device 100 includes a central processing unit (CPU) 130 and device sensors 175 (e.g., proximity sensors/accelerometer or gyroscope, etc.). The processor 130 can be a system-on-chip in some implementations, such as a system-on-chip found in mobile devices, and includes one or more dedicated graphics processing units (GPUs). Further, in some implementations, the processor 130 includes multiple processors of the same type or different types.

In some implementations, the electronic device 100 includes a memory 140. The memory 140 includes one or more types of memory used for performing device functions in conjunction with the processor 130. In some implementations, the memory 140 includes cache, ROM, or RAM. In some implementations, the memory 140 stores various programming modules during execution. In some implementations, the memory 140 can serve as a buffer for storing one or more images during the in-line image processing. In some implementations, the memory 140 stores computer-readable instructions that are executed by the processor 130.

In some implementations, the electronic device 100 includes one or more cameras 110 including RGB or RGB-D cameras.

In some implementations, the electronic device 100 includes camera pose estimator 144, keyframes estimator 146, or pose graph calculator 148.

Many relevant applications in computer vision, robotic and other fields require the capability to acquire 3D models of the environment and to estimate the camera position with respect to the model. Further, such applications often have the capability to then interact with the 3D model by incorporating VR, MR, or AR functionality.

Figure 2:
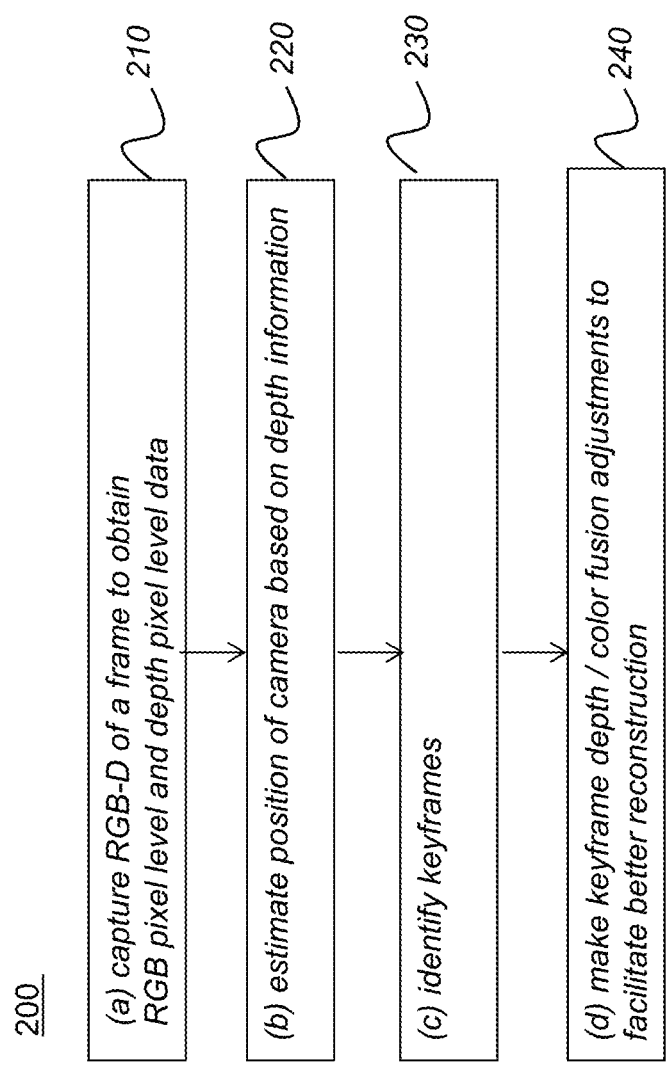
FIG. 2 is a block diagram of a simplified method of fusing depth information from a current frame with an existing keyframe in accordance with some implementations.

FIG. 2 is a flowchart representation of a method 200 of virtual representation of current RGB-D sensor or camera frame or view based on a current pose of the RGB-D camera in accordance with some implementations. In some implementations, example methods 200, 500, 600, and 800 are performed by a device (e.g., electronic device 100 or multifunctional device 900), such as a mobile device, desktop, laptop, or server device. In some implementations, example methods 200, 500, 600, and 800 are performed by processing logic, including hardware, firmware, software, or a combination thereof. In some implementations, example methods 200, 500, 600, and 800 are performed by a processor executing code stored in a non-transitory computer-readable medium (e.g., a memory). In some implementations, example methods 200, 500, 600, and 800 can be performed on a portable electronic device (e.g., laptop, tablet, smartphone, or head-mounted display (HMD) that has a screen for displaying 2D/3D images or a screen for viewing stereoscopic images and including operations such as a VR display, an MR display, or an AR display.

At block 210, the method 200 receives or captures RGB-D information of a current RGB-D camera view. The RGB-D information includes a frame of dense RGB pixels (e.g., frame 305 of FIG. 3A) and a frame of dense depth pixels (e.g., frame 310 of FIG. 3A) for the field of view (FOV) of the RGB-D camera. The frame of dense RGB information is aligned with the frame of dense depth information in the FOV of the RGB-D camera. In some implementations, the method 200 receives color and depth information (e.g., frames of dense RGB pixels and frames of dense depth pixels) for multiple frames of a real world scene within the RGB-D camera FOV at multiple times e.g., video or video content, during each RGB-D camera episode viewing. In various implementations, the method 200 receives depth information as linear depth information or inverse depth information.

At block 220, the method 200 estimates position and spatial orientation of the RGB-D camera (e.g., camera pose) using depth information of the current RGB-D camera frame. In some implementations, the method 200 estimates position and spatial orientation of the RGB-D camera at block 220 using color information of the current RGB-D camera frame. In some implementations, the method 200 estimates position and spatial orientation of the RGB-D camera at block 220 using depth information and color information of the current RGB-D camera frame. In some implementations, at block 220, the method 200 aligns the current RGB-D frame with respect to a virtual reconstruction or model of the real world scene. In some implementations, the method 200 includes a first course alignment of depth data of the current RGB-D frame to depth data of a virtual representation (e.g., the virtual representation of the immediately preceding camera frame) of the real world camera scene, followed by a second fine adjustment to reduce or minimize overall depth frame information error between the aligned current RGB-D frame (e.g., depth) and the virtual representation of the previous frame (e.g., depth) of the real world camera scene. Then, the overall depth frame error is used to determine a pose of the current RGB-D camera view. In one implementation, the depth data alignment in block 220 uses a rigid transformation that "walks" the respective depth data toward each other until the overall depth frame information error therebetween is reduced or minimized. In one implementation, the current RGB-D camera frame is aligned to the virtual reconstruction. In another implementation, the virtual reconstruction is aligned to the current RGB-D camera frame. In one implementation, block 220 also aligns the current RGB color data with respect to RGB color data of the previous virtual reconstruction of the real world scene to reduce or minimize overall RGB color frame information error between the aligned current RGB-D frame (e.g., color) and previous virtual representation (e.g., color) of the real world camera scene. Then, block 220 uses the overall color and depth frame error to determine the pose of the current RGB-D camera view. By aligning the RGB-D frame information of the current camera frame and virtual representation of the previous camera frame, the method 200 is able to estimate the 3D camera pose that generated the current RGB-D image, i.e., where the camera is in 3D space relative to the 3D model and how the camera is oriented in 3D space relative to the 3D model.

Alternatively at block 220, to determine a current RGB-D camera pose, one example operation selects a set of identified features in the depth information of the current RGB-D camera frame and uses alignment of the set of identified features in the current camera depth information to match previous sets of features in depth information in previous frames of the camera and determine camera pose in accordance with matched identified features.

Figure 4A:
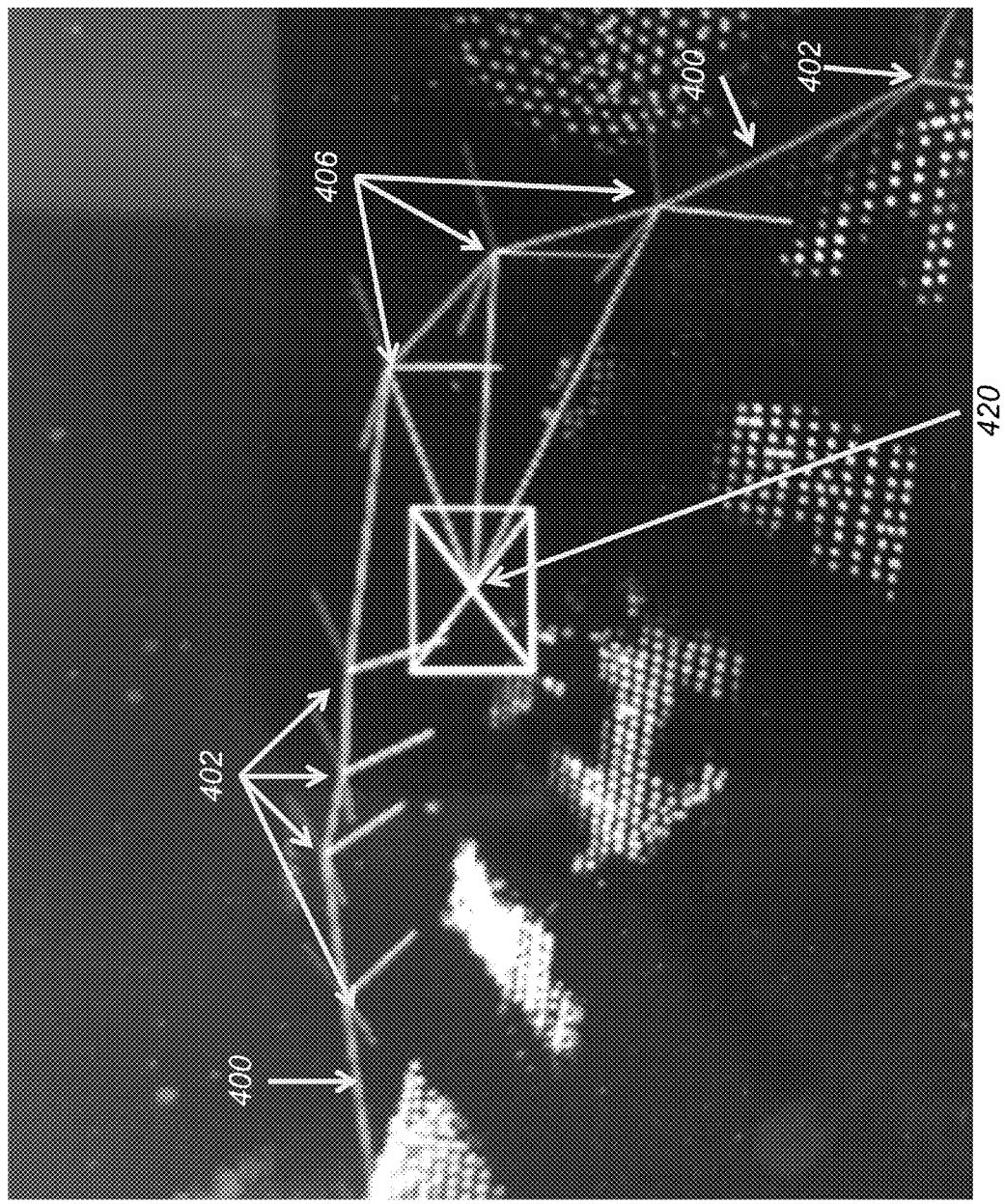
FIG. 4A is a diagram showing an example pose graph, keyframes and a moveable current camera position with respect to a global point cloud for the 3D virtual representation that is being reconstructed in accordance with some implementations.

At block 230, the method 200 identifies keyframes. Keyframes are a subset of all the RGB-D frames of data generated by the RGB-D camera (e.g., within a viewing episode). Each keyframe, like all frames of RGB-D camera data, include aligned RGB color information and depth information associated with a camera pose (e.g., position and orientation in space) at a known time. In various implementations, keyframes are selected using techniques that satisfy keyframes' representation of the 3D virtual reconstruction of the real world scene. In various implementations, keyframes can be identified (e.g., selected among multiple frames) based on motion of the RGB-D camera. When there is sufficient movement (e.g., a 3D spatial distance over a threshold) or enough movement between current camera frame or viewpoint and a nearby keyframe (e.g., the immediately preceding keyframe), a new keyframe is created or initiated. In alternative implementations, keyframe initiation could be based on other characteristics of the RGB-D camera such as time, speed of movement, etc. or the real world scene. Each keyframe can be stored in memory and include RGB information (e.g., frame of fused pixel data), depth information (e.g., frame of fused depth information) and pose (e.g., orientation and 3D position in a 3D coordinate system). A historical record can be made of the relative RGB-D camera movement, which is called a pose graph. FIG. 4A is a diagram showing an example pose graph in accordance with some implementations. As shown in FIG. 4A, keyframes 402 can be assigned or positioned along the pose graph 400 and a current camera position 420 can be shown relative to the pose graph (e.g., FIG. 4A). In accordance with some implementations, the pose graph 400 is shown within a global point cloud of a current viewing episode.

At block 240, the method 200 makes depth/color fusion adjustments to keyframes along the pose graph, which facilitates better 3D virtual reconstruction. In some implementations, locally fusing current RGB-D information of a plurality of RGB-D camera frames into one keyframe improves the quality of the fused keyframes. For example, fusing multiple frames of depth information into a single keyframe can improve the smoothness within the depth information (or depth map) of the keyframe. Fusing multiple frames of depth information into a single keyframe can also reduce noise in the fused keyframe depth information. Thus, fusing multiple frames of depth information into a single keyframe improves the quality of the keyframe depth information. In one implementation, fusing combines a portion of RGB-D video content from a plurality of camera frames into a single keyframe. In one implementation, a keyframe includes more RGB-D data than a single camera frame. In one implementation, in between sequential keyframes, all RGB-D video content (e.g., all camera views) is fused back to the previous keyframe.

Figure 4B:
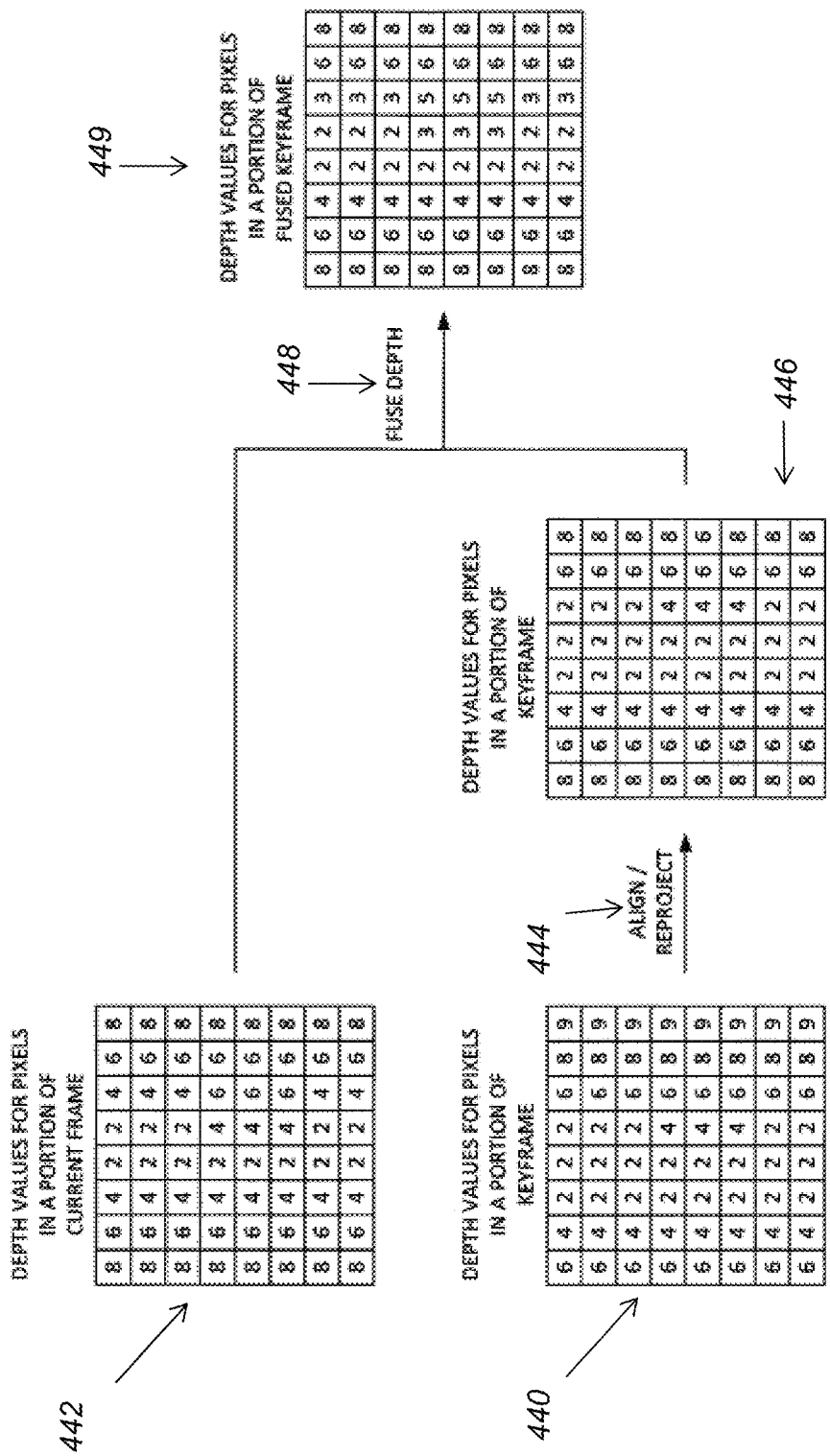
FIG. 4B is a block diagram of a simplified method of fusing depth information from a current frame with an existing keyframe in accordance with some implementations.

FIG. 4B is a block diagram of a simplified method of fusing depth information from a current frame with an existing keyframe in accordance with some implementations. As shown in FIG. 4B, the depth information or frame of depth data 442 of the current RGB-D camera frame is aligned to the depth information or frame of depth data 440 of the selected keyframe. In various implementations, alignment 444 (e.g., to fuse data with keyframes) is a 3D spatial alignment. However, in FIG. 4B, the keyframe depth data 440 is aligned 444 to the depth data 442 of the current RGB-D camera frame by shifting depth pixels values one column to the right. The aligned frame of depth data 446 of the keyframe is then combined with the depth data 442 of the current RGB-D camera view. In various implementations, the depth data can be combined 448 by simple averaging (e.g., as shown in FIG. 4B) or complex weighted averaging of the aligned depth data 446 of the keyframe and the depth data 442 of the current RGB-D camera view. In some implementations, the depth data 442 of the current RGB-D camera frame and the keyframe depth data 440 include probabilistic values (e.g., confidence values) that provide more robust or accurate combining 448 of the depth data 442 of the current RGB-D camera frame to the aligned depth data 446 of the keyframe, which results in "fused" keyframe data 449. For example, the depth probabilistic values can be uniquely attached to each pixel or at a reduced granularity addressed to a plurality of spatially related pixels, data-related pixels, or the like. Generally, the aligned depth data 440 of the keyframe is more accurate than the depth data 442 of the current RGB-D camera view. In FIG. 4B, the depth data 446 of the keyframe was aligned to the depth data 442 of the current RGB-D camera view, however, the depth data 442 of the current RGB-D camera frame can be aligned to the keyframe depth data 440.

Fusing the current RGB information into keyframes can be accomplished in a similar manner as the keyframe depth information fusing (e.g., see FIG. 4B). Color data of the current RGB-D camera frame needs to be aligned to the color data of the keyframe. After alignment, probabilistic values (e.g., confidence values) attached to pixels in the frame of RGB information of the RGB-D camera frame and the frame of RGB information of the keyframe are used to fuse the color frame of information together. In one implementation, alignment of the depth information is sufficient to align the color information for fusing RGB-D data from a current camera frame to a keyframe.

The fusing of multiple frames of RGB color information into a single keyframe can reduce noise in the fused keyframe RGB image frame. Fusing multiple frames of RGB color information into a single keyframe can allow generation of high dynamic range (HDR) color information at the single fused keyframe by exploiting the fact that the shutter of the RGB-D camera is changing in time while portions of the RGB-D camera view are overlapping. Thus, each keyframe will have more/better information (e.g., HDR information and/or HDR pixel values) than any single RGB color frame of one RGB-D camera view. HDR images reproduce a greater dynamic range of luminosity (e.g., wavelength-weighted power emitted or reflected) than is possible with standard digital imaging or photography and may present a similar range of luminance to that experienced through the human visual system. HDR can be achieved by capturing and then combining several different, narrower range, exposures of the same subject matter.

Figure 5:
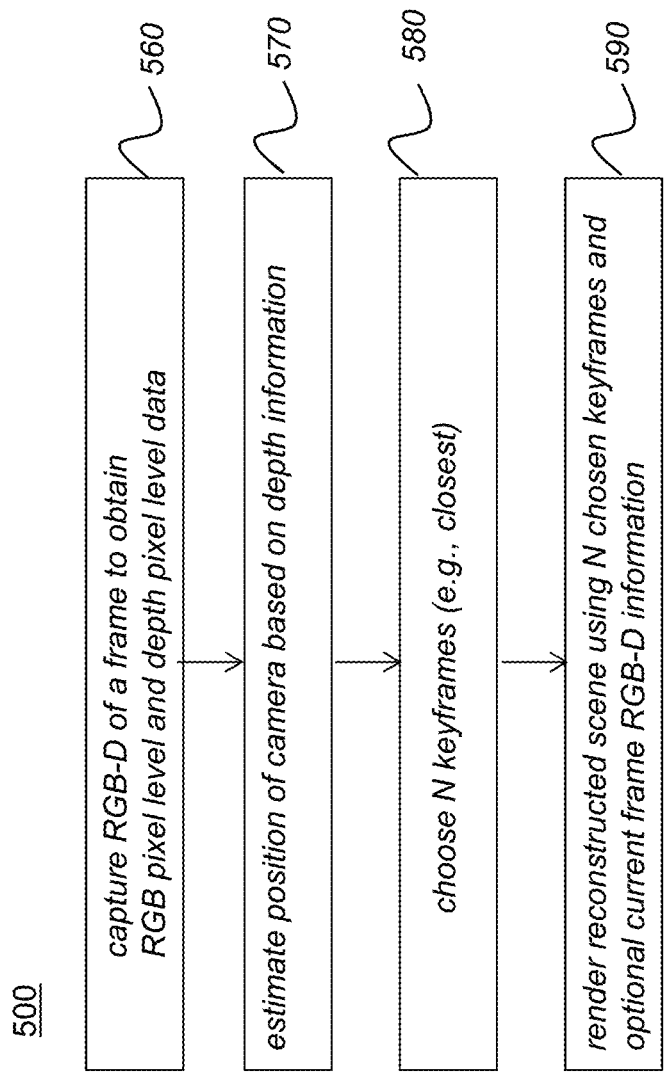
FIG. 5 is a block diagram of a simplified method for 3D reconstruction of a real world scene in accordance with some implementations.

FIG. 5 is a block diagram of a simplified method for 3D reconstruction of a real world scene based on pixel-level fusing of keyframes to provide dense reconstructions in accordance with some implementations.

At block 560, a method 500 receives or captures RGB-D information of a current camera frame (e.g., as described above at block 210).

At block 570, the method 500 can estimate position and spatial orientation of the RGB-D camera (e.g., camera pose) using depth information or color information of the current camera frame (as described at block 220).

At block 580, the method 500 chooses N keyframes where N is a positive integer greater than 1. In one implementation, the chosen or selected N keyframes are closest to the current camera position (e.g., pose). In one implementation, N is between 3-5. In some implementations, the "closest" keyframes are selected using a horizontal distance or a 3D spatial distance that includes distances in the x, y, and z directions. In some implementations, keyframes can be identified or created based on other factors. In various implementations, keyframes can be identified or created based on motion of the RGB-D camera. When there is sufficient movement (e.g., over a threshold) or enough movement between the current camera frame and a nearby keyframe such as the immediately preceding keyframe, a new keyframe is identified/created (e.g., as described at block 230).

At block 590, in various implementations, the method 500 can use the N selected keyframes when reconstructing the real world 3D scene of the current frame of the RGB-D camera. To render a current virtual reconstruction of the current camera view, the color and depth information of the N keyframes is re-projected into the current camera view-point (e.g., based on the position of the camera identified in block 570) and combined (e.g., fused) to reconstruct a 3D virtual representation of the real world scene. At block 590, by using depth fusion and color fusion for the fused keyframes (e.g., block 240, FIG. 4B), various implementations enable dense, high quality reconstructions of the real world scene in real time. Thus, more accurate, higher quality, smoother, reduced noise, or high dynamic range color reconstructions are generated. For example, fusing multiple frames of RGB color information into a single keyframe can allow reconstruction of high dynamic range texture by exploiting the fact that the shutter of the camera is changing in time while portions of the camera frame are overlapping. A reconstruction 330 is shown in FIG. 3B in accordance with some implementations.

At block 590, in some implementations each color pixel value and depth pixel value has a corresponding probabilistic value (e.g., confidence value/trustworthiness). In this case, once re-projected into the same camera view, the color and depth information from the N selected keyframes is combined according to the probabilistic values. In some implementations, the respective N keyframe depth values are fused together (e.g., with the optional color and depth information of the current RGB-D camera viewpoint) and the respective N keyframe color values are fused together to compose a single corresponding virtual reconstruction in real-time of the current camera frame of the environment.

Figure 6:
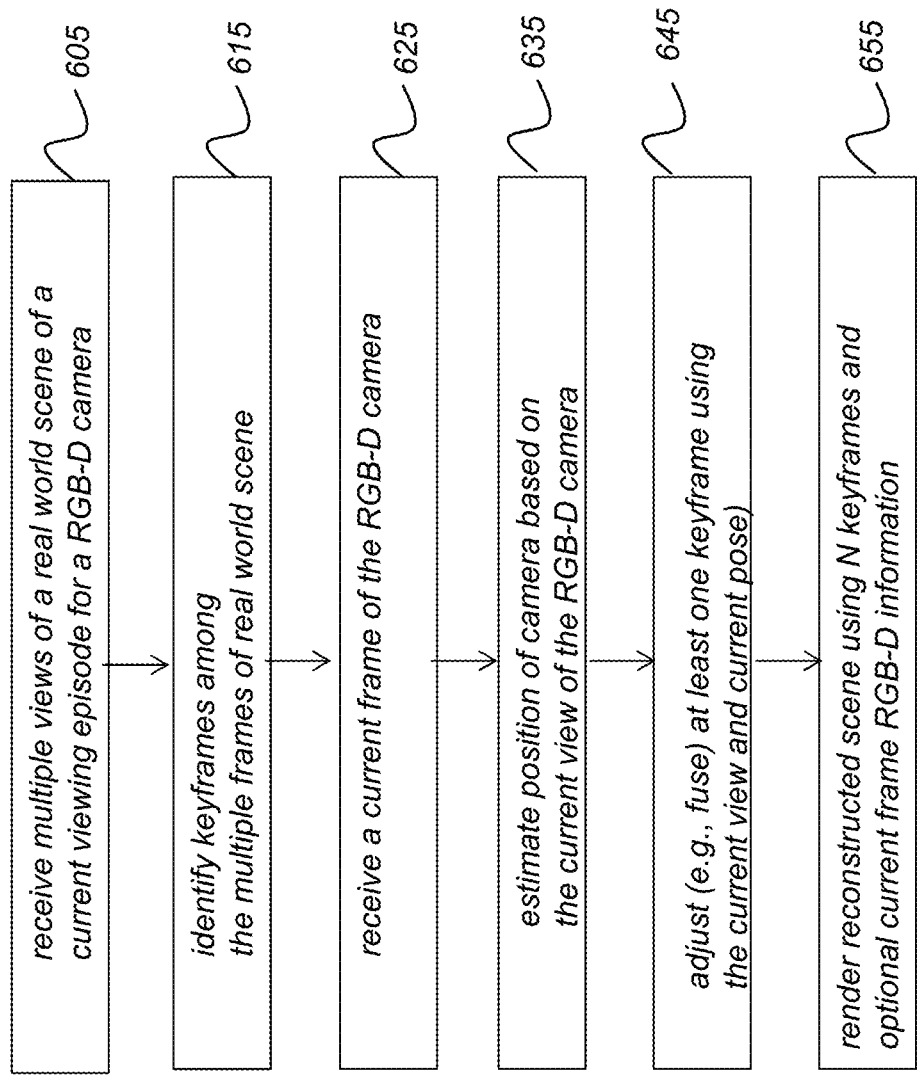
FIG. 6 is a block diagram of a simplified method for 3D reconstruction of a real world scene based on pixel-level fusing of color or depth information at keyframes in accordance with some implementations.

FIG. 6 is a block diagram of a simplified method for 3D reconstruction of a real world scene based on pixel-level fusing of color or depth information at keyframes in accordance with some implementations. As shown in FIG. 6, at block 605, a method 600 receives color and depth information for multiple frames of a real world scene within a field of view of a RGB-D camera at multiple times, the color and depth information including color values and depth values for pixels for the field of view of the camera at each of the multiple times (e.g., as described above at block 210).

At block 615, the method 600 identifies keyframes including color and depth information for selected frames of the multiple frames of the RGB-D camera and associated camera positions defined in a three dimensional (3D) coordinate system.

At block 625, the method 600 receives a current frame of the RGB-D camera, the current frame including current color values and current depth values for the pixels for the field of view of the RGB-D camera at a current time. At block 635, the method 600 determines a current pose of the RGB-D camera in the 3D coordinate system based on the current frame of the camera.

At block 645, the method 600 adjusts (e.g., updates) at least one keyframe of the keyframes based on the current frame and current pose. In one implementation, the keyframe is adjusted by fusing color values of the keyframe with the current color values or fusing depth values of the keyframe with the current depth values (e.g., as described at block 240 and FIG. 4B).

At block 655, the method 600 provides a virtual representation of the current frame of the real world scene based on at least one of the keyframes. In various implementations, at block 655, the virtual representation of the current frame is formed using the current pose of the RGB-D camera and two or more of the keyframes, the virtual representation provided by fusing color and depth information of the two or more of the keyframes. In some implementations, the two or more keyframes themselves have fused color and depth information (e.g., as described at block 240 and FIG. 4B).

Figure 8:
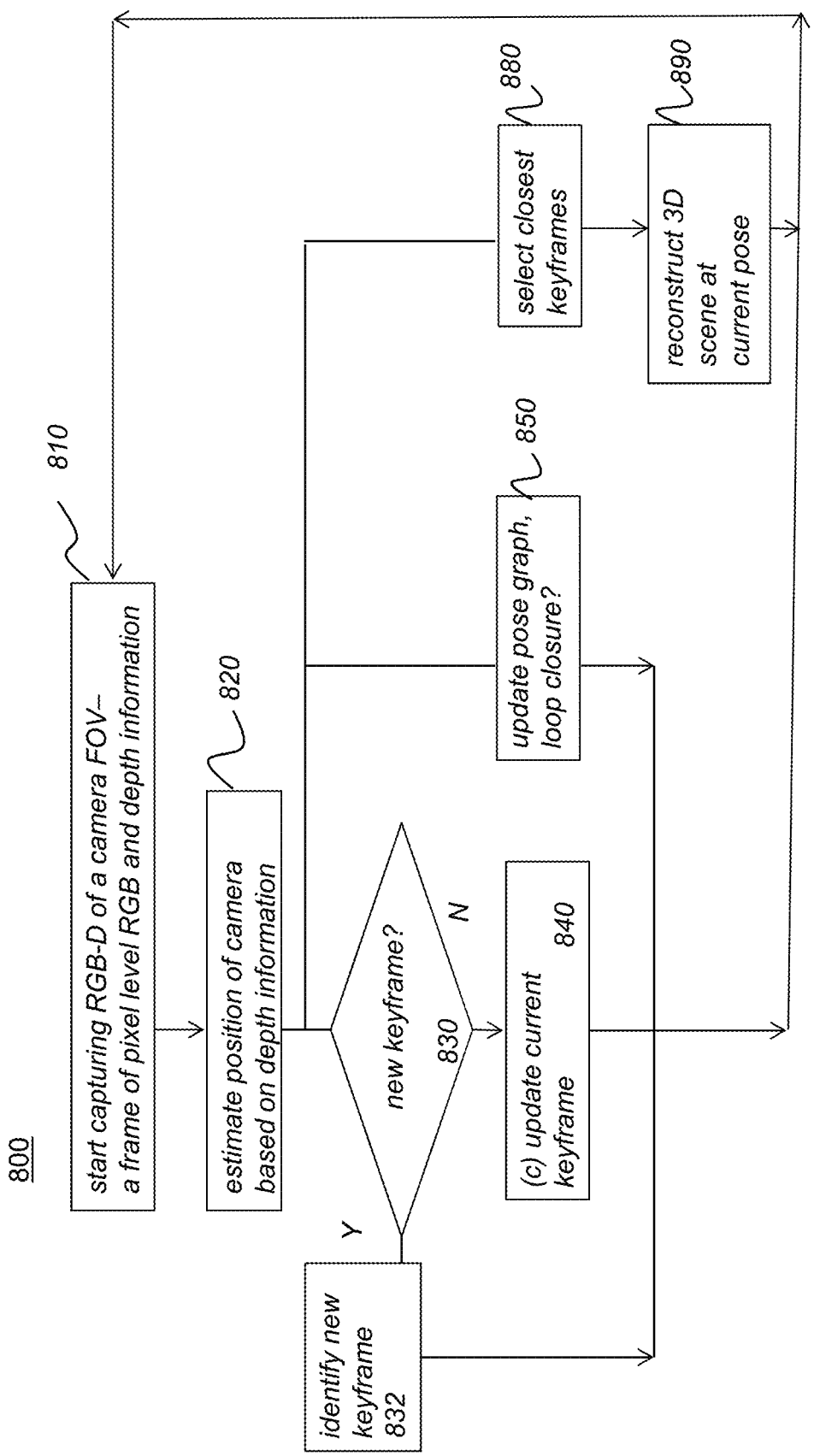
FIG. 8 is a block diagram of a simplified method for 3D reconstruction of a real world scene in accordance with some implementations.

FIG. 8 is a flowchart representation of a method 800 of virtual representation of a current RGB-D camera FOV of a real world 3D scene based on the current pose of the RGB-D camera in accordance with some implementations. In various implementations, a method 800 can use received RGB-D video or periodic aligned RGB images and depth images to both (1) localize RGB-D camera spatial position(s) defined in a three dimensional (3D) coordinate system and (2) reconstruct a 3D virtual representation of a current RGB-D camera view, each in real time.

As shown in FIG. 8, at block 810 a method 800 can receive color and depth information for multiple frames of a real world scene within a field of view of a RGB-D camera at multiple times. The color and depth information can include color values and depth values for pixels for the field of view of the camera at each of the multiple times. The color and depth information can include frames of RGB and aligned depth data. In one implementation, the multiple frames at the multiple times form a RGB-D camera viewing episode.

At block 820, the method 800 estimates position and spatial orientation of the camera (e.g., camera pose) using depth information or color information of the current camera frame (e.g., see block 220).

At block 830, the method 800 identifies keyframes based on camera motion. Keyframes include aligned RGB image and depth information associated with a camera pose (e.g., position and orientation in space) at a known time. If it is determined at block 830 that this is the first frame of a current camera viewing episode, a new keyframe is created/identified at block 832. Alternatively, if it is determined at block 830 that there is sufficient movement of the camera position (e.g., greater than a prescribed distance) from any existing keyframe or an immediately preceding in time keyframe, a new keyframe is created/identified in block 832 using the color and depth information of the current camera field of view. Otherwise, control passes from block 830 to block 840 and the current keyframe is adjusted (e.g., updated). In some implementations, the keyframe is adjusted by combining one or more frames into the keyframe. In one implementation, color and depth information of the current camera FOV is fused into an existing keyframe (e.g., the immediately preceding keyframe). The fusing is accomplished by fusing color values and fusing depth values for pixels for the field of view (e.g., see block 240).

Figure 7:
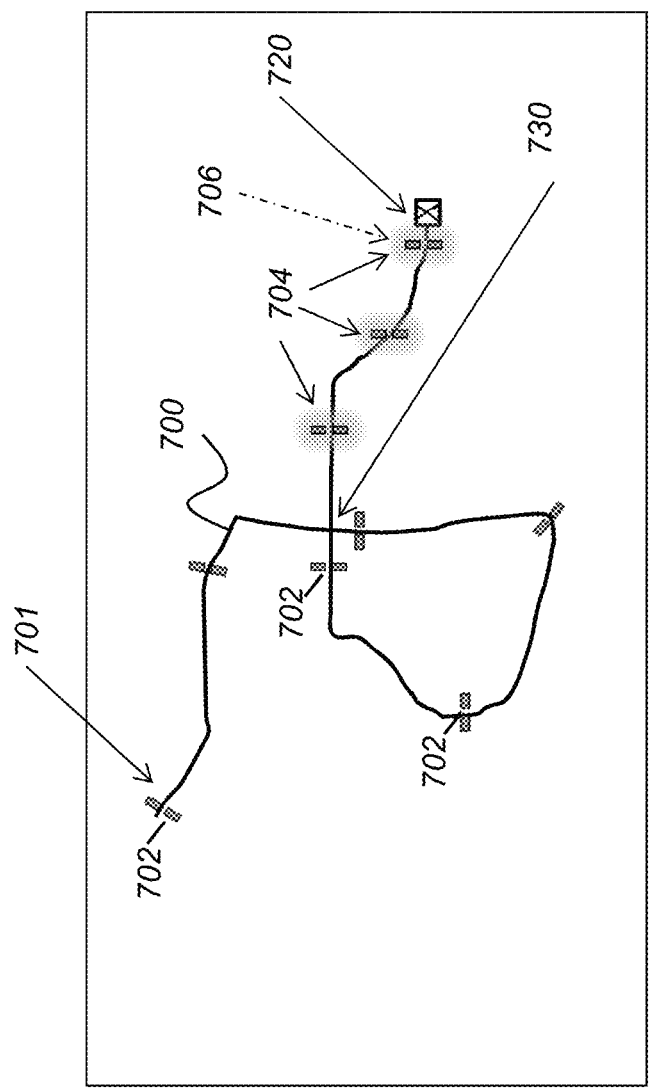
FIG. 7 is a diagram showing a current camera episode pose graph, in accordance with some implementations.

At block 850, the method 800 can use the current camera pose to generate or update a current camera viewing episode pose graph. Each camera viewing episode starts at one point, and then begins moving away from that starting point. As shown in FIG. 7, a pose graph 700 has a starting point 701 and a current camera position 720 that can be movably shown relative to the pose graph 700. In accordance with some implementations, the pose graph 700 can also include keyframes 702/704. As shown in FIG. 7, N=3 keyframes 704 are used in the current virtual reconstruction of the current camera viewpoint.

In one implementation as shown in FIG. 7, when moving the current RGB-D camera around existing keyframes, the method 800 is fusing current RGB-D camera information to immediately preceding keyframe 706. In FIG. 7, the current RGB-D camera position is extending the pose graph 700. In another implementation as shown in FIG. 4A, current RGB-D camera frames (e.g., information) are being fused to keyframes 406, which are being used in the current virtual reconstruction of the current camera viewpoint, and the current RGB-D camera position is not extending the pose graph 400.

Since the camera trajectory and the 3D model are both estimated relative to each other, measurement errors can accumulate during each RGB-D camera viewing episode. In other words, there is measurement drift accumulating in camera depth measurements over time, which then causes drift in camera position. Each camera viewing episode begins at one starting point, and then moves away from the starting point. Accordingly, drift in camera position will start accumulating because of errors in the depth measurements over time. One example operation to reduce or minimize drift in camera position throughout the camera viewing episode (e.g., pose graph) is loop closure. When, it is detected that the camera position has returned to a previous position (e.g., thereby closing a loop in the pose graph), errors of the accumulated drift can be determined and then corrected. Further, that correction can be used to update all keyframes along the pose graph to reduce drift errors throughout the pose graph. In FIG. 7, a loop closure point 730 is shown in pose graph 700. For example, the correction determined at the loop closure point can be re-propagated to correct the 3D position and 3D rotation (e.g., orientation) of each keyframe along the graph in space.

At block 880, the method 800 can select N keyframes (e.g., see block 580). Preferably, the N keyframes are closest to the novel current RGB-D camera viewpoint (e.g., as illustrated in the pose graph 700). For example, N can between 2-10.

At block 890, the method 800 can use the N selected keyframes when reconstructing the real world 3D scene of the current frame of the RGB-D camera. To render a current virtual reconstruction of the current camera view, the color and depth information of the N keyframes is re-projected into the current camera viewpoint (e.g., based on the position of the camera identified in block 570) and combined (e.g., fused) to reconstruct a 3D virtual representation of the real world scene (e.g., see block 590).

Figure 9:
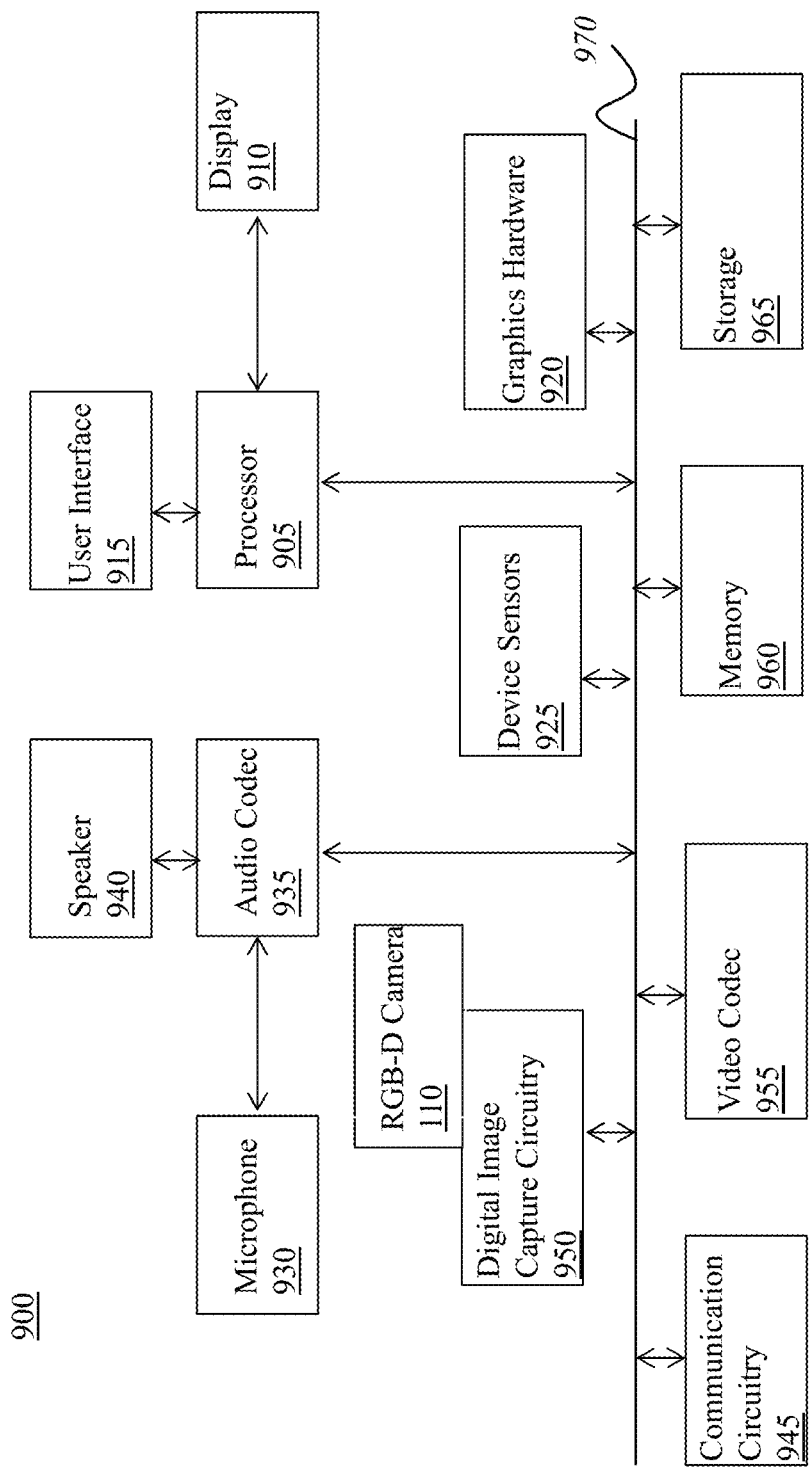
FIG. 9 is a block diagram that illustrates a simplified multifunctional device in accordance with some implementations.

Referring now to FIG. 9, a simplified functional block diagram of a multifunction device 900 is shown in accordance with some implementations. In some implementations, multifunction electronic device 900 includes processor 905, display 910, user interface 915, graphics hardware 920, device sensors 925 (e.g., proximity sensor/ambient light sensor, accelerometer or gyroscope), microphone 930, audio codec(s) 935, speaker(s) 940, communications circuitry 945, digital image capture circuitry 950 (e.g., including RGB-D camera 110), video codec(s) 955 (e.g., in support of digital image capture unit 950), memory 960, storage device 965, and communications bus 970. In some implementations, the multifunction electronic device 900 is a digital camera, portable electronic device or a personal electronic device, such as a personal digital assistant (PDA), personal music player, mobile telephone, or a tablet computer.

In some implementations, the processor 905 executes instructions necessary to carry out or control the operation of many functions performed by the device 900 (e.g., the generation or processing of images as disclosed herein). The processor 905, for instance, drives the display 910 and receives user input from the user interface 915. The user interface 915, in some implementations, allows a user to interact with the device 900. For example, the user interface 915 can take a variety of forms, such as a button, keypad, dial, a click wheel, keyboard, display screen or a touch screen. The processor 905 can also, for example, be a system-on-chip such as those found in mobile devices and include a dedicated graphics processing unit (GPU). In some implementations, the processor 905 is based on reduced instruction-set computer (RISC) or complex instruction-set computer (CISC) architectures or any other suitable architecture and may include one or more processing cores. The graphics hardware 920 in some implementations is a special purpose computational hardware for processing graphics or assisting the processor 905 to process graphics information. In some implementations, the graphics hardware 920 includes a programmable GPU.

In some implementations, the image capture circuitry 950 uses sensors (or pixel sensors, or sensor elements, or pixel elements) to capture images or events. Output from the image capture circuitry 950 is processed, at least in part, by the video codec(s) 955 or the processor 905 or the graphics hardware 920, or a dedicated image processing unit or pipeline incorporated within the circuitry 950. Images so captured can be stored in the memory 960 or storage 955.

In some implementations, the images captured by sensors and the camera circuitry 950 are processed in accordance with the methods disclosed herein, at least in part, by video codec(s) 955 or processor 905 or graphics hardware 920, or a dedicated image processing unit incorporated within the circuitry 950. Images so captured or processed are stored in memory 960 or storage 965. The memory 960 includes one or more different types of media used by the processor 905 and graphics hardware 920 to perform device functions. For example, the memory 960 can include memory cache, read-only memory (ROM), or random access memory (RAM). The storage 965 can store media (e.g., audio, image and video files), computer program instructions or software, preference information, device profile information, and any other suitable data. In some implementations, the storage 965 includes one more non-transitory storage mediums including, for example. magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). In some implementations, the memory 960 and storage 965 are used to tangibly retain computer program instructions or code organized into one or more modules and written in any desired computer programming language. When executed by, for example, the processor 905, such computer program code can implement one or more of the methods described herein.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, elements, or components, but do not preclude the presence or addition of one or more other features, integers, steps, operations, elements, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method, comprising:
at an electronic device with one or more processors:
receiving multiple frames of a real world scene within a field of view of a camera at multiple times, the frames comprising color values and depth values for pixels for the field of view of the camera;
selecting keyframes from the multiple frames of the real world scene within the field of view of the camera, the keyframes associated with camera poses defined in a three dimensional (3D) coordinate system;
receiving a current frame of the real world scene currently within the field of view of the camera, the current frame comprising current color values and current depth values for the pixels for the field of view of the camera at a current time;
determining a current camera pose of the camera in the 3D coordinate system based on the current frame; and
providing a virtual representation of the current frame based on the current camera pose of the camera, the current frame, and one or more of the keyframes, the virtual representation provided based on the color values and the depth values of the one or more of the keyframes, wherein providing the virtual representation of the current frame comprises,
selecting the one or more of the keyframes based on spatial proximity of the camera pose associated with each of the selected keyframes to the current camera pose; and
combining pixel values of the selected one or more of the keyframes and pixel values of the current frame for pixels in the field of view of the current camera pose to provide the virtual representation of the current frame.

2. The method of claim 1, further comprising:
selecting two or more of the keyframes based on spatial proximity of camera poses associated with the keyframes to the current camera pose;
projecting the selected two or more of the keyframes into the current camera pose.

3. The method of claim 2, wherein the combining comprises:
corresponding probability variance values of the depth values of the selected two or more of the keyframes and the current frame;
corresponding probability variance values of the color values of the selected two or more of the keyframes and the current frame using high-dynamic range image processing; or corresponding probability variance values of the depth values and combining the color values using corresponding probability variance values of the color values of the selected two or more of the keyframes and the current frame.

4. The method of claim 1, further comprising adjusting a keyframe of the keyframes, wherein the keyframe is adjusted by combining at least one frame of the multiple frames of the real world scene into the keyframe until a condition for selecting a new keyframe is satisfied.

5. The method of claim 4, wherein the condition for selecting a new keyframe is a prescribed 3D spatial distance from a camera position of the current camera pose to a camera position of a camera pose of an immediately preceding keyframe in the 3D coordinate system.

6. The method of claim 1, further comprising adjusting a keyframe of the keyframes, wherein the keyframe is adjusted by combining the depth values from multiple subsequent frames of the real world scene with the depth values of the keyframe and combining the color values from multiple subsequent frames of the real world scene with the color values of the keyframe until a condition for selecting a new keyframe is satisfied.

7. The method of claim 1, further comprising:
forming a historical pose graph of a path traveled by the pose of the camera during a current episode recording, wherein the current episode recording includes the multiple frames of the real world scene;
storing the keyframes in memory, the keyframes corresponding to relative 3D spatial positions in the historical pose graph;
comparing a camera position of the current camera pose to the historical pose graph;
determining a loop closure condition when the current camera position matches a camera position in the historical pose graph of the current episode recording; and
updating the keyframes of the current episode recording, wherein the loop closure condition is determined by image frame comparison.

8. The method of claim 1, wherein determining the current camera pose of the camera comprises:
defining a function to warp the color values and depth values of the current frame to color values and depth values of a virtual representation of an immediately preceding frame of the camera, wherein the function results in different error amounts in color values and depth values for different potential current camera poses; and
determining the current camera pose by minimizing error in color values and depth values using the function.

9. The method of claim 1, wherein the pixel values include at least one of color values and depth values.

10. A method, comprising:
at an electronic device with one or more processors:
receiving multiple frames of a real world scene within a field of view of a camera at multiple times, the frames comprising color values and depth values for pixels for the field of view of the camera;
selecting keyframes from the multiple frames of the real world scene within the field of view of the camera, the keyframes associated with camera poses defined in a three dimensional (3D) coordinate system;
receiving a current frame of the real world scene currently within the field of view of the camera, the current frame comprising current color values and current depth values for the pixels for the field of view of the camera at a current time;

determining a current camera pose of the camera in the 3D coordinate system based on the current frame;

adjusting each of a plurality of the keyframes by combining the depth values using corresponding probability variance values of the depth values of said each keyframe and combining the color values using corresponding probability variance values of the color values of said each keyframe, and the color values and the depth values from multiple subsequent frames of the real world scene; and providing a virtual representation of the current frame based on the current camera pose of the camera and at least one of the adjusted keyframes.

11. The method of claim 10, wherein each keyframe comprises RGB-D data from multiple subsequent frames of the real world scene.

12. The method of claim 10, where adjusting the keyframe comprises:

combining multiple subsequent frames of the real world scene into an immediately preceding keyframe until a spatial distance condition for selecting a new keyframe is satisfied, wherein the combining comprises combining the depth values using corresponding probability variance values of the depth values and combining the color values using corresponding probability variance values of the color values of the multiple subsequent frames into the immediately preceding keyframe, wherein the immediately preceding keyframe is the keyframe, wherein the selected two or more of the keyframes comprise the adjusted keyframe.

13. The method of claim 10, further comprising:

forming a historical pose graph of a path traveled by the pose of the camera during a current episode recording; and storing the keyframes in memory, the keyframes corresponding to relative 3D spatial positions in the historical pose graph.

14. The method of claim 13, further comprising:

comparing a camera position of the current camera pose to the historical pose graph;

determining a loop closure condition when the current camera position matches a camera position in the historical pose graph of the current episode recording; and updating the keyframes of the current episode recording, wherein the loop closure condition is determined by image frame comparison.

15. The method of claim 10, wherein determining the current camera pose of the camera comprises:

defining a function to warp the color values and depth values of the current frame to color values and depth values of a virtual representation of an immediately preceding frame of the camera, wherein the function results in different error amounts in color values and depth values for different potential current camera poses; and determining the current camera pose by minimizing error in color values and depth values using the function.

16. The method of claim 10, wherein providing the virtual representation of the current frame comprises selecting two or more of the keyframes based on spatial proximity of camera poses associated with the keyframes to the current camera pose.

17. The method of claim 10, wherein the camera outputs dense red-green-blue-depth (RGB-D) information.

18. The method of claim 10, wherein said each of the adjusted keyframes is adjusted by combining the color values and the depth values from the multiple subsequent frames of the real world scene into said each adjusted keyframe until a condition for selecting a new keyframe is satisfied.

19. The method of claim 18, wherein said each of the adjusted keyframes is adjusted based on a corresponding keyframe camera pose and camera poses of the multiple subsequent frames of the real world scene.

20. A method, comprising:

at an electronic device with one or more processors:

receiving multiple frames of a real world scene within a field of view of a camera at multiple times, the frames comprising color values and depth values for pixels for the field of view of the camera;

selecting keyframes from the multiple frames of the real world scene within the field of view of the camera, the keyframes associated with camera poses defined in a three dimensional (3D) coordinate system;

receiving a current frame of the real world scene currently within the field of view of the camera, the current frame comprising current color values and current depth values for the pixels for the field of view of the camera at a current time;

determining a current camera pose of the camera in the 3D coordinate system based on the current frame;

adjusting a keyframe of the keyframes based on the current frame and current pose, the keyframe adjusted by combining the depth values using corresponding probability variance values of the depth values and combining the color values using corresponding probability variance values of the color values of the keyframe and the current frame; and providing a virtual representation of the current frame based on the current camera pose of the camera and at least one of the adjusted keyframes, wherein providing the virtual representation of the current frame comprises, selecting two or more of the keyframes based on spatial proximity of camera poses associated with the keyframes to the current camera pose, projecting the selected two or more of the keyframes into the current camera pose; and combining the projected selected two or more of the keyframes and the current frame to provide the virtual representation, wherein the combining comprises combining the depth values using corresponding probability variance values of the depth values and combining the color values using corresponding probability variance values of the color values of the selected two or more of the keyframes and the current frame.

* * * * *